United States Patent [19]

Gschwender et al.

[11] Patent Number: 5,073,736

[45] Date of Patent: Dec. 17, 1991

[54] BRUSHLESS PUMP MOTOR WITH BUILT-IN ELECTRONIC CONTROL

[75] Inventors: Alois Gschwender, Neubulach; Detlef Walther, Stuttgart; Horst Krüger, Sulzfeld; Rüdiger Pawlischta, Ersingen, all of Fed. Rep. of Germany

[73] Assignee: Flux- Geräte GmbH, Maulbronn, Fed. Rep. of Germany

[21] Appl. No.: 376,759

[22] Filed: Jul. 7, 1989

[30] Foreign Application Priority Data

Jul. 9, 1988 [DE] Fed. Rep. of Germany ....... 3825035

[51] Int. Cl.$^5$ .......................... H02K 5/00; H02K 9/06
[52] U.S. Cl. ........................................ 310/88; 310/43; 310/63; 310/68 A
[58] Field of Search ................ 318/254, 318; 417/371; 310/68 R, 68 A, 68 B, 87, 88, 89, 43, 45, 62, 63

[56] References Cited

U.S. PATENT DOCUMENTS

| | | | |
|---|---|---|---|
| 2,769,105 | 10/1956 | Altschwager et al. | 310/88 |
| 4,172,295 | 10/1979 | Uesugi | 417/423.14 |
| 4,348,603 | 9/1982 | Huber | 310/68 A |
| 4,626,724 | 12/1986 | Morishita et al. | 310/89 |
| 4,658,164 | 4/1987 | Gotoh | 310/89 |
| 4,692,676 | 9/1987 | Dohl et al. | 318/254 |
| 4,931,678 | 6/1990 | Lutz | 310/89 |

Primary Examiner—Steven L. Stephan
Assistant Examiner—D. L. Rebsch
Attorney, Agent, or Firm—Robert W. Becker & Associates

[57] ABSTRACT

A motor for a pump, especially a pump for a drum, barrel, or other tanks or containers. The motor has a housing in which a rotor is surrounded by a stator. The motor is an electronically commutated direct current motor that has no brushes. The switch or control device of the motor is an electronic switch or control device that is accommodated in the housing.

19 Claims, 1 Drawing Sheet

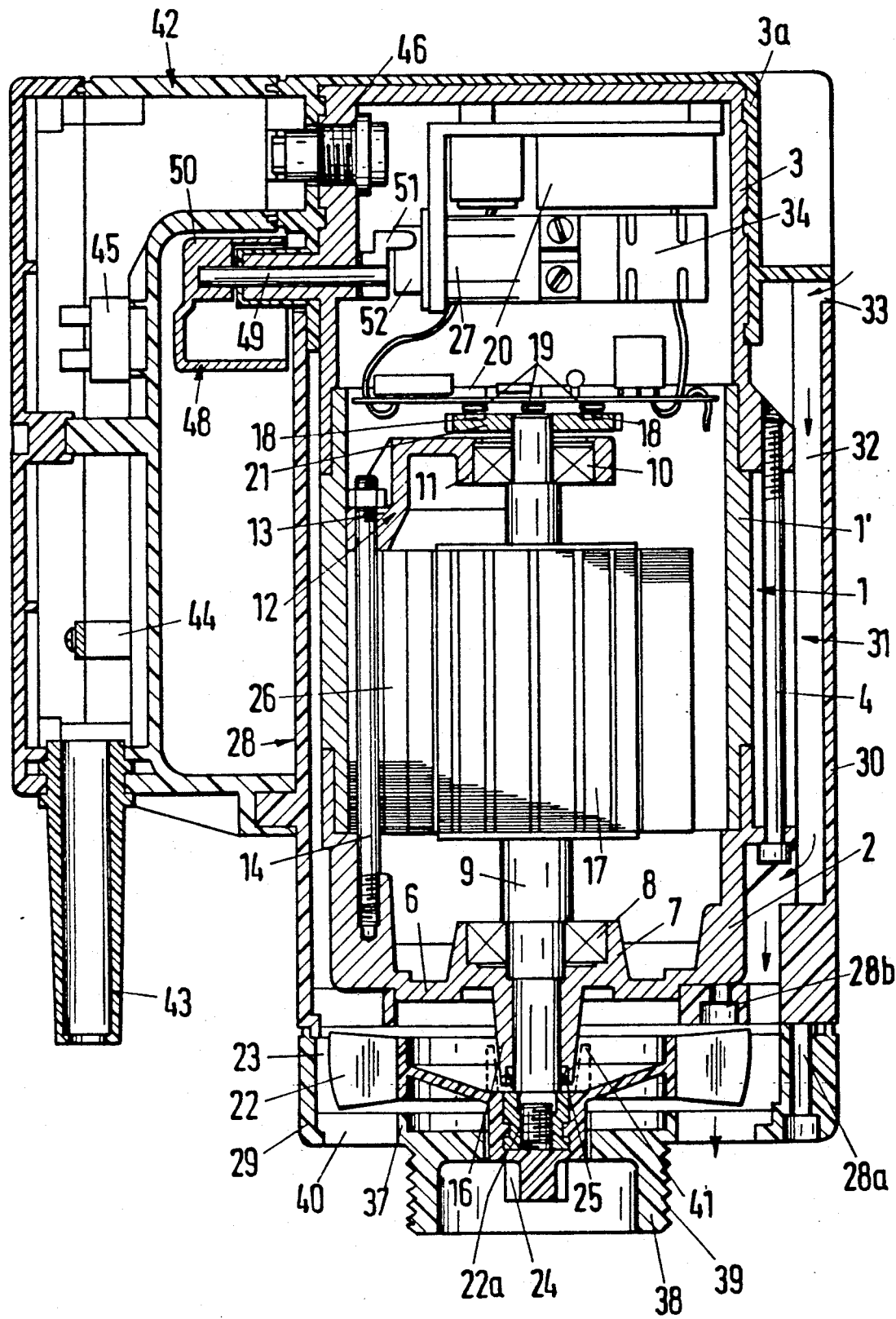

5,073,736

BRUSHLESS PUMP MOTOR WITH BUILT-IN ELECTRONIC CONTROL

BACKGROUND OF THE INVENTION

The present invention relates to a motor for a pump, especially a pump for a drum, barrel, or other tanks or containers. The pump includes a preferably pressure-encased or shielded housing in which a rotor, via its rotor shaft, is rotatably mounted; a stator disposed in the housing and surrounding the rotor; and a power supply line that is connected to a switch or control device.

Such pump motors are conventionally embodied as commutator motors. The problem with such motors is that deposits of carbon dust form in the motor housing over time. This is especially the case with closed, pressure-encased housings Undesired current leakage can then occur. This can lead to the formation of sparks. If such a pump is operated in explosion-prone areas, explosions can occur due to this spark formation. Since the formation of sparks occurs only if these commutator motors are not properly operated, a potential equalization is directed to be undertaken on the pump motors in order to prevent the harmful formation of sparks. However, such a potential equalization is frequently not undertaken either for reasons of convenience or oversight.

For this reason, pump motors have been developed with which the danger of explosions is to a large extent precluded, even where the motor is not operated properly. With these motors, the explosion-proof, pressure-encased pump motor is double insulated, with the metallic motor housing being surrounded by plastic installation. However, even with these motors, leakage currents can still occur due to the presence of carbon dust deposits in the interior of the housing. The known commutator motors furthermore have the drawback that the brushes and commutators wear out. The service life of such motors is therefore relatively short, being of the order of magnitude of approximately 500 operating hours.

It is an object of the present invention to provide a motor of the aforementioned general type that can be operated without danger even where the motor is not operated properly, and that has practically no parts that are subject to wear, so that the motor has a very long service life and is very economical to manufacture.

BRIEF DESCRIPTION OF THE DRAWING

This object, and other objects and advantages of the present invention, will appear more clearly from the following specification in conjunction with the accompanying schematic drawing, which is a longitudinal cross-sectional view through one exemplary embodiment of the inventive pump motor.

SUMMARY OF THE INVENTION

The motor of the present invention is characterized primarily in that it is an electronically commutated direct current motor that has no brushes, and in that the switch or control device is an electronic switch or control device that is accommodated in the housing.

As indicated, the inventive motor is an electronically commutated direct current motor that has no brushes With such a motor, no internal carbon dust contamination occurs, so that the current leakage connected therewith in heretofore known commutator motors can be reliably precluded. For this reason, the inventive motor, if it has a pressure-encased housing, can be operated without danger in explosion-prone areas. The entire electronic switch or control device is accommodated in the motor housing. Since with the inventive motor no carbon dust occurs, the electrical insulating system of this motor remains practically unaltered even after very long periods of operation. The reliability against accidents is thereby assured during the entire service life of the inventive motor. Since the interior of the housing remains free of carbon dust, the measures that are required for the protective class II of DIN (German Industrial Standards Association)/VDE (Association of German Electrical Engineers) can be easily carried out. The electronic switch or control device can, for example, be designed for a voltage range of 12 volts to 240 volts, so that this motor can then be readily used for the protective classes I, II, and III.

Further specific features of the present invention will be described in detail subsequently.

DESCRIPTION OF PREFERRED EMBODIMENTS

Referring now to the drawing in detail, the inventive motor has a housing 1 that comprises a bottom part 2, a top part 3, and a middle part 1'. The ends of the top and bottom parts 3 and 2 of the housing extend over the middle part 1'. All three of the parts 1', 2, 3 of the housing 1 are axially secured relative to one another by screws or bolts 4. The bottom part 2 of the housing has a base 6 that is provided with a centrally disposed cylindrical raised portion 7 that is directed toward the middle part 1' of the housing. The raised portion 7 carries a bearing 8, such as a roller bearing or a friction bearing, for a rotor shaft 9, which extends through the raised portion 7 and extends into the top part 3 of the housing. Approximately at the level of the top end of the middle part 1' of the housing, the rotor shaft 9 is rotatably supported by a further bearing 10, which similarly can be a roller bearing or a friction bearing. The bearing 10 is carried by a cylindrical raised portion 11 that is centrally provided on a bearing bracket 12 that has, on its periphery, a rim 13 that extends axially beyond the raised portion 11 and rests against the inner wall of the middle part 1' of the housing. The bearing bracket 12 is secured to the lower, thicker end of the bottom part 2 of the housing via screws or stay bolts 14. The bearing bracket 12 and the rim 13 are preferably integrally constructed, thus permitting simple installation during assembly of the motor.

The bottom part 2 of the housing with the central raised portion 7 is similarly preferably integrally constructed. On that side remote from the middle part 1' of the housing, the raised portion 7 is provided with an extension 16 that extends beyond the base 6; the rotor shaft 9 extends through and is guided by the extension 16.

In an explosion-proof motor, the parts 1', 2, 3 of the housing are made of metal. The motor then has the necessary pressure encasement or shielding. In this connection, the bearing bracket 12 can also be made of metal, although it is also possible to construct the bearing bracket 12 of plastic. If the motor need not be explosion-proof and pressure shielded, the motor housing 1 can be made of any suitable material. If the motor is circulation cooled, the housing 1 can even be made of plastic.

The motor has a rotor 17, which in the illustrated embodiment is a multiple permanent magnet rotor. The rotor shaft 9 is rotatably supported in the two bearings 8 and 10. Fixedly seated on that end of the rotor shaft 9 that is disposed in the top part 3 of the housing are magnets 18 that in conjunction with stationary Hall sensors 19 operate as means to recognize the position of the rotor and supply an electronic device 20 with the information necessary to determine the rotor position. The magnets 18 are provided in a carrier member 21 that is preferably embodied in a disk-like manner as a fan or ventilator in order to prevent a build up of heat in the interior of the housing 1. On that side of the bearing bracket 12 remote from the middle part 1' of the housing, the carrier member 21 is seated on the free end of the rotor shaft 9.

The rotor shaft 9 extends through the base 6 of the bottom part 2 of the housing, and carries in the region beyond the housing 1 a fan wheel 22 that is accommodated in a chamber 23. The rotor shaft 9 extends through this fan chamber 23 and carries on its free end, which is disposed beyond the fan chamber 23 a coupling element 24 with which the rotor shaft 9 can be drivingly connected in a known manner with a pump shaft. Since corrosive liquids are often pumped with such pumps, it is advantageous to prevent penetration of corrosive vapors into the interior of the housing via a seal 25. This seal is preferably a radial shaft packing that is accommodated in the extension 16 of the bottom part 2 of the housing; this extension 16 is disposed within the fan chamber 23.

The fan wheel 22 and the coupling element 24 are advantageously integrally constructed. If the motor is to be used in protective class II, as prescribed by DIN/VDE, the fan wheel 22 and the coupling element 24 are made of electrically insulating material. In this case, the fan wheel 22 is expediently provided with a metallic threaded sleeve or bushing 22a via which the fan wheel 22 can be threaded onto the rotor shaft 9. The threaded bushing 22a is surrounded by electrically insulating plastic, so that in the event of a failure or malfunction, a reliable protection against contact with the outside is assured.

The rotor 17 is surrounded by a stator 26 that is fixedly accommodated in the middle part 1' of the housing. Via a multi-phase winding, the stator 26 can be supplied with current by means of the electronic power device 20, thereby exciting the non-illustrated stator coils that are necessary for the rotational movement.

Depending upon load, the described permanent magnet rotor follows synchronously, being shifted by a slight angle relative to its rotating field. As a consequence of the recognition of the rotor position via the magnets 18 and the Hall sensors 19, the permanent magnet rotor cannot fall out of "step", as is otherwise customary with synchronous motors.

With the electronic device 20, it is possible to automatically reduce the speed as a function of current, and hence of load, if this is required, for example due to a more viscous medium that is to be pumped. It is to be understood that it is also possible to manually adjust the speed, for example via a potentiometer, as a function of current and hence load. Furthermore, a thermal monitoring of the winding is possible via a positive temperature coefficient resistor, which is particularly advantageous at low speeds because the cooling effect is then impaired. The electronic device 20 can also be provided with an undervoltage coil 34 that reliably prevents, in conjunction with the motor protection switch 27, the automatic restarting upon a loss of power or the like.

The housing 1 is surrounded by a plastic shell 28 that is embodied as a casing which comprises two parts 29 and 30 that are detachably interconnected by screws 28a. The part 29 of the casing is secured to the bottom part 2 of the housing 1 via screws 28b that cannot be contacted from the outside. The plastic casing parts 29, 30 surround the parts 1', 2 of the housing 1. In the illustrated embodiment, the part 3 of the housing 1 has plastic 3a molded therearound. In this way, the housing 1 is completely surrounded by plastic If the motor is used in areas that are prone to explosion, a plastic is used that cannot become electrostatically charged. Provided in the casing parts 29, 30 of the plastic shell 28 is an air circulation system 31 in order to cool the critical region of the parts 1', 2, 3 of the housing 1 in which are accommodated the motor and control parts, such as the stator 26 with coils or the electronic device 20, which generate heat. The air circulation system 31 comprises air circulation channels 32 that preferably extend in the axial direction of the parts 1', 2, 3 of the housing from the air inlet 33 into the fan chamber 23. At the bottom, the fan chamber 23 is delimited by a base 37 of the plastic casing part 29; the base 37 is spaced from the fan wheel 22, with the fan wheel and the coupling element 24 extending through the base. A circular collar 38 projects perpendicularly from the base 37. The collar 38, which is provided with an external thread 39, extends at a distance about the coupling element 24 on the rotor shaft 9. Just like the base 37, the collar 38 preferably comprises an insulating plastic. These components are preferably integrally formed with the casing part 29.

The air circulation channels 32 are advantageously delimited by non-illustrated, axially extending ribs that are provided on the inside of the casing part 30. The casing part 30 rests against the outer wall of the part 1' of the housing 1 via these ribs. Under suitable thermal stress, such air circulation channels can also be provided on the outer side of the part 1' of the housing 1. The air inlet 33 is expediently formed by individual inlet openings that are distributed over the periphery of the plastic shell 28 and through which the air can be drawn in by the fan wheel 22. The air then flows in the air circulation system 31 in the direction of the arrows that are indicated. The base 37 of the casing part 29 is provided with outlets 40 for the discharge of air. During operation of the motor, the air that flows between the housing 1 and the plastic shell 28 absorbs heat that is generated and carries it off. This reliably prevents excessive thermal stressing of the motor. In particular, the electronic device 20 is protected in this manner from being overheated. This is to a great extent accomplished by the air circulation that occurs in the housing 1 and that is generated as a result of the configuring of the carrier member 21 as a fan wheel.

In order to achieve a better withdrawal of heat when the housing is metallic, the outside of the part 3 and/or the part 1' and/or the part 2 of the housing 1 can be provided with cooling ribs, thereby assuring a very rapid dissipation of heat as a result of the air that is flowing through.

If the housing 1 is made of metal, it is also possible to coat the inside of the housing with an insulating plastic. This assures that the metallic housing 1 cannot have voltage applied thereto, even if damage to current-carrying components should occur in the housing 1.

Since in the illustrated embodiment the housing 1 is surrounded by a plastic shell 28 that cannot be electrostatically charged, the motor does not have to be provided with a potential equalization if the motor is used in spaces that are prone to explosion. This not only facilitates handling of the motor, but in particular this also avoids undertaking the potential equalization.

The motor that has just been described is an electronically commutated motor for pumps for a drum, barrel, or other tanks or containers. If the housing 1 is made of metal, a motor can, in particular, be used as an explosion-proof motor. One of the greatest advantages of the inventive motor is its practically unlimited freedom from maintenance, because the direct current motor has no brushes. As a result, no carbon dust enters the housing 1 during the entire life of this motor. Thus, the inner insulation system remains practically unaltered, even after very long periods of operation. If the inventive motor is to fulfill the conditions of protective class II of DIN/VDE, the measures necessary herefor can be carried out very easily, because no carbon dust results in the housing 1. It is therefore necessary to merely for the absolutely necessary leakage and air paths, which can, however, be achieved without difficulty. The inventive motor therefore has an extremely long service life, which corresponds approximately to the service life of the bearings 8, 10. It is to be understood that in all chambers of the motor where this is necessary, the features for the protective class II are to be undertaken. With the protective class I of DIN/VDE, these particular measures can be dispensed with. The motor can be embodied as an explosion-proof motor by having a metallic, pressure-tight housing that is electrically insulated on the outside with the plastic shell 28.

If the motor is explosion-proof, the housing can also be divided into two chambers, whereby one chamber can be pressure encased and the other chamber can be embodied with an increased protective reliability "e" against explosion (European safety measure standard 50 014). The motor 16, 17 can be accommodated in the non pressure-encased chamber that has the explosion protection "e". This chamber is then designed in such a way that certain temperatures cannot be exceeded therein The electronic device 20 as well as the double pole controlling and monitoring motor protection switch 27 are accommodated in the pressure-tight encased chamber, thereby reliably preventing the formation of sparks, which could lead to an explosion.

To activate the motor, the motor protection switch 27 is provided, which is designed in conformity with the respective type of protection. Due to the absence of an inner carbon dust contamination, a very reliable motor results, the reliability of which is maintained up to the end of the service life of the motor. The motor can be designed for a voltage of from 12 volts to approximately 240 volts, and can be supplied directly with the appropriate voltage. Since the entire electronic device 20 is accommodated in the housing 1, no switchboards, switch boxes, etc. are required for the motor, as was necessary with the heretofore known motors. Furthermore, the motor of the present invention can be manufactured in a very economical manner.

In place of the described radial shaft packing 25, it is possible to provide on the fan wheel 22 a ring 41 (shown in dashed lines) that extends about the extension 16 of the housing part 2 at a distance therefrom; as a result, in cooperation with the extension 16, a type of labyrinth seal is formed that, together with the air flowing through the fan chamber 23, prevents the penetration of corrosive vapors.

The described electronically commutated direct current motor, which in itself is known, can be accommodated in the relatively small inner space of the housing 1 because instead of a transformer, a power supply having no transformer is used, which then has correspondingly small dimensions. This power supply can be connected directly to the electric circuit. The power supply voltage is then processed with an appropriate switching mechanism within the direct current motor in a known manner for driving the motor windings.

The drawing additionally shows a plastic handle 42 with a cable sleeve 43, a traction relief device 44 for the non-illustrated power supply line, and a connection terminal 45. If the motor is explosion-proof, the bushings 46 for the lead-in lines are designed in accordance with the customary DIN/VDE provisions.

To actuate the motor protection switch 27, an actuating mechanism 48 is disposed below the handle 42. This actuating mechanism 48 is provided with a control shaft 49 that extends into the housing 1 and that must be turned by a further handle 50 that is disposed outside the housing Within the housing 1, the control shaft 49 carries an eccentrically mounted driver 51 with which a switching lever 52 of the motor protection switch 27 can be pivoted into its two positions. In this manner, the motor can be easily turned on and off by rotating the further handle 50.

The present invention is, of course, in no way restricted to the specific disclosure of the specification and drawing, but also encompasses any modifications within the scope of the appended claims.

What we claim is:

1. In a motor for a pump including: a housing in which a rotor, via its rotor shaft, is rotatably mounted; a stator disposed in said housing and surrounding said rotor; and a power supply line that is connected to a switch or control device, the improvement wherein:
   said motor is an electronically connected direct current motor that has no brushes;
   said switch or control device is an electronic switch or control device that is accommodated in said housing;
   said direct current motor is provided with means to recognize the position of said rotor;
   said recognition means includes at least one magnet ring that is fixedly connected to said rotor shaft, and sensors, that are associated with said magnet ring; and
   said magnet ring is part of a carrier member that is embodied as an auxiliary fan means and is fixedly seated on said rotor shaft.

2. A motor according to claim 1, in which a bearing bracket is provided in said housing between said electronic switch or control device and the stator/rotor assembly.

3. A motor according to claim 1, wherein said sensors are Hall sensors.

4. A motor according to claim 1, which includes a actuating mechanism for indirectly actuating a motor protection switch from the outside.

5. A motor according to claim 1, in which said recognition means is connected to said electronic switch or control device.

6. A motor according to claim 1, in which said housing is provided with an electrically insulating covering.

7. A motor according to claim 6, in which said covering is a plastic shell 112, and into which said housing is placed.

8. A motor according to claim 7, in which said shell comprises at least two parts.

9. A motor according to claim 7, which includes means for cooling at least those parts of said motor that generate heat during operation.

10. A motor according to claim 9, which includes means for supplying cooling air to the outside of at least that part of said housing that is exposed to heat.

11. A motor according to claim 9, which includes at least one air circulation system between said shell and said housing.

12. A motor according to claim 7, which includes at least one fan wheel seated on said rotor shaft.

13. A motor according to claim 12, in which said fan wheel is disposed beyond said housing.

14. A motor according to claim 13, in which said shell is provided with a fan chamber in which said fan wheel is accommodated.

15. A motor according to claim 14, in which said rotor shaft has an end that is disposed at an a mechanical outlet of said housing and is sealed relative thereto via at least one seal.

16. A motor according to claim 15, in which said housing is provided with an extension that projects into said fan chamber, with said at least one seal being provided on said extension.

17. A motor according to claim 14, in which said housing is provided with an extension that projects into said fan chamber; and in which said fan wheel, in order to form a labyrinth seal, is provided with a ring-like collar that surrounds said extension in such a way as to form a narrow gap between them.

18. A motor according to claim 1, in which said housing is provided on the inside with an electrically insulating lining.

19. A motor according to claim 18, in which said shield is provided on the inside with cooling ribs.

* * * * *